Figures 1, 2:
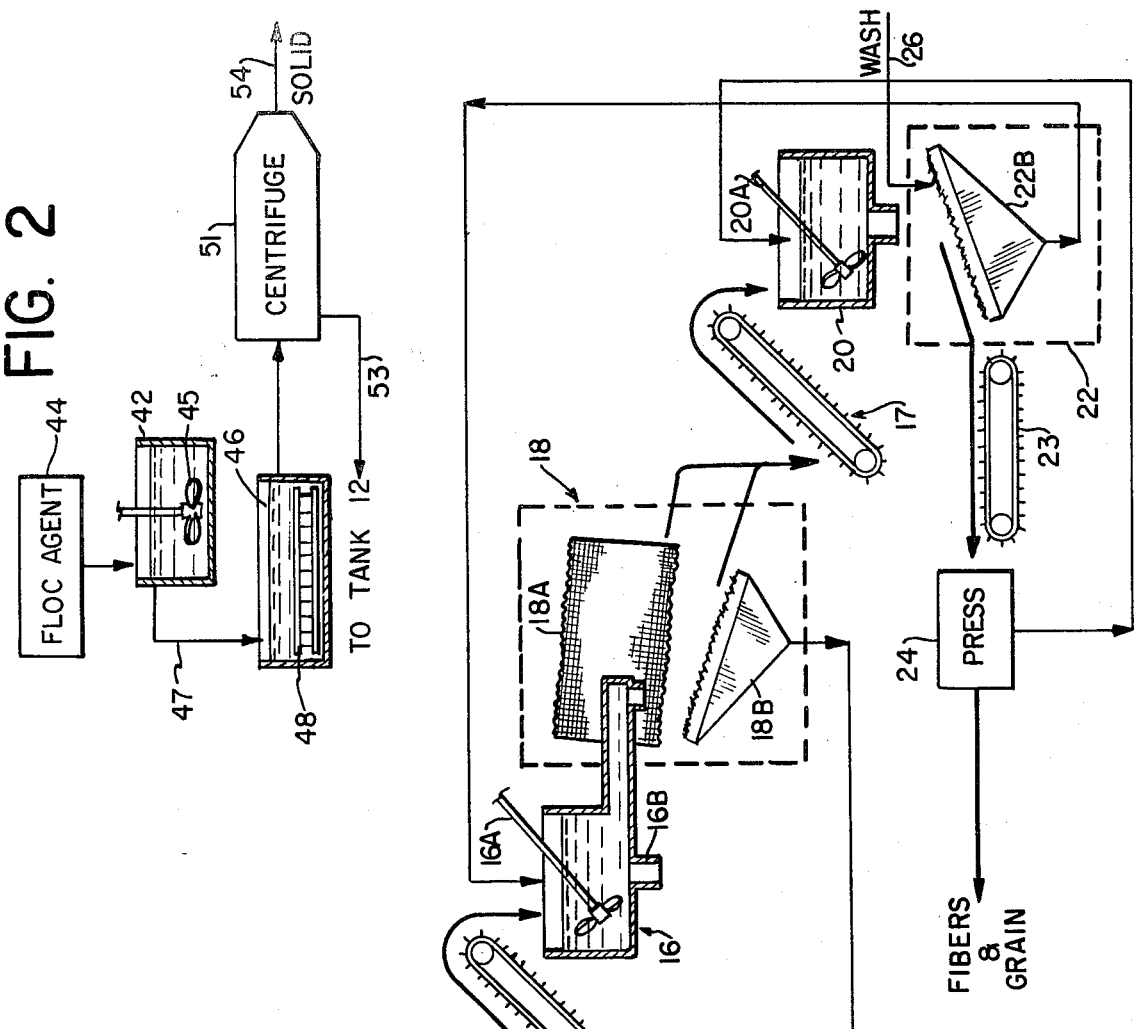

United States Patent [19]
Seckler et al.

[11] 3,875,319
[45] Apr. 1, 1975

[54] PROCESS AND APPARATUS FOR RECOVERING FEED PRODUCTS FROM ANIMAL MANURE

[75] Inventors: David W. Seckler; Judson M. Harper, both of Fort Collins, Colo.

[73] Assignee: Ceres Ecology Corporation, Denver, Colo.

[22] Filed: Aug. 16, 1973

[21] Appl. No.: 388,902

[52] U.S. Cl. ............... 426/431, 426/478, 426/489, 210/73, 210/74
[51] Int. Cl. ............................................ A23k 1/00
[58] Field of Search .......... 71/21, 22; 426/431, 436, 426/437, 478, 489, 490, 495, 506, 807; 210/65, 67, 69, 73, 74

[56] References Cited
UNITED STATES PATENTS

| | | | |
|---|---|---|---|
| 2,293,028 | 8/1942 | Fischer | 210/73 |
| 3,375,116 | 3/1968 | Anthony | 99/2 |
| 3,550,524 | 12/1970 | Brumagin | 99/235 |
| 3,645,893 | 2/1972 | Rohrer | 210/52 |
| 3,732,089 | 5/1973 | Megronigle | 71/21 |

*Primary Examiner*—A. Louis Monacell
*Assistant Examiner*—Hiram H. Berhstein
*Attorney, Agent, or Firm*—Darby & Darby

[57] ABSTRACT

A process and apparatus for recovering valuable feed products from animal manure by adding water to the manure to form a slurry from which mineral matter, grain and fiber particles, proteineous material and water are recovered by successive slurry-forming and liquid/solid separation stages. The recovered water is reused in the forming of the initial manure slurry and in subsequent steps of the process. The recovered grain and fiber particles and proteineous material are useful as feed products which can be refed to the animals from which the manure is collected or, of course, other animals.

8 Claims, 2 Drawing Figures

PROCESS AND APPARATUS FOR RECOVERING FEED PRODUCTS FROM ANIMAL MANURE

This invention relates to a process and apparatus for recycling animal manure. More specifically, this invention relates to a manure recycling process and apparatus particularly adapted to large scale operations such as, for example, modern cattle feedlots.

It is known that the digestive processes of certain animals, particularly cattle and other ruminants, are inefficient. As a result, substantial portions of undigested food pass through the animal and are eliminated as manure. In addition, manure contains other valuable nutrients, principally protein in the form of microbiological entities created during the digestive process. The desirability of recovering the undigested food and these other nutrients (sometimes referred to as "recycling") has been recognized, and it is a principal object of this invention to provide an improved process for recovering such products.

There are other important reasons to recycle manure. The accumulation of manure in pens creates dust in hot, dry weather which is detrimental to the health of cattle and obnoxious to people. When feedlots become wet after heavy rain or snow they become virtual swamps in which cattle gains are retarded and death rates increased. The decomposing manure creates powerful and noxious odors which pollute urban areas. Some of the nitrogen removed by evaporation may be reabsorbed by open bodies of water and during periods of heavy rain and snow, runoff from cattle feedlots may enter streams and also contribute to water pollution.

Since manure has only slight value as fertilizer, the cattle feeder must dispose of it at his own expense. Because of the vast quantities of manure produced by commercial feedlots such disposal may have harmful affects on the environment unless special and costly precautions are taken. Moreover, since the manure inevitably is mixed with the floors of soil and gravel pens, a substantial proportion of the material removed must be returned in the form of new floors. Although this last problem can be avoided by the use of concrete floors, feedlot owners have not fully accepted concrete floors partly for economic reasons because of the area required and when the area is reduced materially, accumulation of manure creates greater problems than those which the concrete floor is intended to solve.

Thus, the problem of manure disposal adds materially to the cost of meat.

Various processes have been proposed for recycling manure both for the purpose of recovering valuable nutrients and to overcome environmental and other problems encountered in attempting to dispose of the manure. For example, it has been suggested to ferment large batches of whole manure in order to kill the bacteria, and then mix the fermented product with a standard animal feed such as corn or the like, for refeeding to the animals. However, wet fermented manure cannot be readily used in feed rations in large operations because of management problems associated with delivery, mixing, consumption control and low "shelf life." Further, the naturally occurring mix of proteins and carbohydrates is not optimal for balanced feed rations and because of its low palatability, only small amounts of fermented manure can be mixed with the feed.

U.S. Pat. No. 3,375,116 of Anthony, dated Mar. 26, 1968, discloses a manure recycling process in which a slurry of water and manure is formed and the liquid and solid fractions of the slurry separated. The solids or dewatered matter may be used as food, while other valuable nutrients, notably protein, are removed from the liquid fraction or wash water for use as a feed supplement. The Anthony process has been found to be fully operable on small-scale operations but it requires large amounts of water, disposal of which also presents severe environmental problems. For this reason, and also because of the specific dewatering or separating techniques proposed by Anthony, the process disclosed in the patent has not previously been commercially feasible for processing all of the manure from large feedlots where, for example, it may be necessary to handle the manure from as many as two hundred thousand or even more animals.

The problems involved in adapting the basic Anthony process for mass production or for use with large feedlots are in part due to the physical nature of the raw manure which is removed from the feedlot. In the first place, the manure itself will vary in viscosity depending on environmental conditions. Additionally, where the feedlot has a dirt floor, the manure will be mixed with sizable quantities of mineral matter which ultimately must be separated from the mixture. Thirdly, because of the nature of the manure, it is difficult to physically separate the liquid and solid fractions of the slurry. It is also difficult to extract the proteineous matter most of which is in the form of dissolved materials and fine particles held in a colloidal suspension in the liquid fraction.

U.S. application Ser. No. 288,250 filed Sept. 12, 1972 (now abandoned) pertains to a manure recycling system using the basic Anthony process with special features and improvements intended to enable the basic process to be used economically with large feedlots. Among other things, that system includes the recycling of the wash water (after removal of nutrients) and special separating techniques for removing the solids from the slurry and extracting the protein and other nutrients from the liquid fraction.

The present invention is an improvement over the basic Anthony process and the process described in application No. 288,250 by virtue of its ability to recycle large amounts of manure produced, for example, by the largest known feedlots. The process requires relatively small amounts of water and produces virtually no waste products which must be disposed of, with the exception of rocks and other debris which may have been mixed with the raw manure.

The invention provides a further improvement in its preferred embodiment, because it produces a higher concentration of protein in the liquid fraction (or wash water), thus enabling more efficient and more complete recovery of these valuable nutrients.

Briefly, in accordance with the invention, a first water-manure slurry is separated into solid and liquid fractions. The solid or dewatered matter from the first separator is slurried in a second mixing tank, and the liquid and solid fractions of this second tank are also separated. In the preferred embodiment, three or more mixing tanks and corresponding liquid-solid separators are cascaded, with the liquid fraction from each separator being added to the solid matter in the preceding mixing tank. The solid fraction of the last separator may be washed and pressed to provide a feed product consisting essentially of undigested grains and fibers. The liquid fraction from the initial separating or dewatering step is treated to remove other valuable nutrients. In the preferred embodiment, the proteineous matter may be sufficiently concentrated in this first liquid fraction to enable protein recovery on a commercially feasible scale by evaporation only.

The invention is described in detail below with reference to the annexed drawings, wherein:

FIG. 1 is a flow diagram showing a preferred embodiment of a manure recycling process according to the invention; and FIG. 2 is a flow diagram of an alternative portion of the process represented in FIG. 1 for extracting proteineous matter.

Reference will be made herein to solid and liquid fractions of the slurries which exist in the process although such fractions are neither entirely dry nor entirely liquid. The liquid fraction is actually a slurry of water and fine solids, and includes also most of the dissolved material. The solid fraction consists of wet solids (e.g., coarse fibers and grains). Accordingly, in the following specification and claims, the terms "liquid fraction" and "solid fraction" are to be regarded as relative terms intended to distinguish between two components of a slurry. Depending upon the particular separating process, the amount of solids contained in the liquid fraction (and vice versa) will vary. In the drawings the flow of solid fractions is shown in heavier lines than the flow of liquid fractions.

In describing the invention, reference will be made to a flow diagram showing diagrammatically the various steps of a preferred process. The apparatus used to perform the various steps may be commercially available equipment and, therefore, is not described in detail.

Referring to FIG. 1, raw manure recovered from an animal feedlot is ground by a hammer mill or other suitable device 10 and then conveyed in any suitable fashion to a first mixing tank 12. Device 10 shreds the raw manure to divide lumps of manure into constituent particles, without substantial grinding of the particles, and thus aids in the subsequent slurrying steps. Preferably, the feedlot will have a concrete floor to minimize contamination but, obviously, the invention may be used with any type of feedlot or other confinement.

The size of the first mixing tank 12 depends upon the amount of manure to be processed and, to some extent, the manner in which the manure is delivered to the tank 12. For example, if the manure is delivered to the tank 12 in truckload batches, a somewhat larger tank would be required than if the manure were delivered in a steady stream such as, for example, by auger, chain drive or conveyor belt.

A slurry is formed in the first mixing tank 12 as described below, the slurry comprising about 15 to 30 percent dry matter and about 85 to 70 percent water. These percentages may vary widely, with more water being desirable with freshly collected manure because of the presence of mucous. The amount of water in the raw manure collected from the feedlot may vary substantially (for example, from about 50 to about 80 percent) and, therefore, the amount of water to be added to tank 12 will vary accordingly. For example, the amount of water added to slurry tank 12 may vary from none to about three pounds of water for each pound of raw manure.

In addition to water, a small amount of chlorine may be introduced into the slurry tank 12 in order to kill some of the bacteria and reduce or eliminate the smell of the slurry. Conventional apparatus may be used for this purpose. The amount of chlorine added is ordinarily less than twenty parts of chlorine per million parts of slurry. A suitable detergent (such as a surfactant) may also be added to the slurry in tank 12 to aid in the dissolving process. Also, the slurry in tank 12 may be heated (e.g., by introduction of steam) to reduce its viscosity and thus facilitate subsequent liquid/solid separation stages. If the slurry is heated to about 120°F some bacteria will be killed, which may be desirable.

Mixing tank 12 may be provided with a standard agitator 12A which serves to mix the slurry to an approximately uniform consistency. The agitator may be of the propeller type or any other conventional type used in analogous applications. Tank 12 may include a trap 12B toward which rocks and sand will tend to sink for periodic removal as required.

The slurry from tank 12 is delivered to a first liquid-solid separator 14 which separates the slurry into liquid and solid fractions. In an experimental embodiment, separator 14 consisted of a coarse rotary screen 14A which rotated above a pitched finer mesh vibrating screen 14B. The slurry was fed axially into one end of the rotary screen and the coarse wet solids were conveyed axially through the screen 14A by appropriate vanes or the like while finer solids and the liquid fraction fall through to vibrating screen 14B. These finer solids are separated by screen 14B and combined with the coarse solids from rotary screen 14A to yield the solid fraction from the separator 14.

The particular mesh size selected for screens 14A and 14B will depend in part upon the characteristics of the manure which, in turn, may depend upon the type of feed eaten by the animals from which the manure is collected. For example, if the manure is collected from cattle which have been fed whole kernel corn, the manure will contain a certain proportion of partially digested whole kernels. In such a case, the coarse rotating screen 14A may have openings of about ½ of an inch across so that only the larger kernels and coarse bits of fiber or straw are retained on the screen 14B while the remainder of the manure slurry washes through the rotating screen 14A to the vibrating screen 14B. On the other hand, if the manure is collected from cattle that have been fed ground grain, the rotating screen 14A may have openings of about 3/16 of an inch across or less so as to retain the larger undigested bits of ground grain and coarse bits of fiber or straw.

Instead of helping to separate the solid fraction from tank 12, rotary screen 14A may be used to further shred the manure into its constituent particles and to screen rocks and other undesired objects from the slurry. In such a case, the mesh size will be selected to allow the solid and liquid fractions of the slurry to pass through to screen 14B. An augur or the like may be used to remove the undesired material from the exit end of the screen 14A.

The vibrating screen 14B has a finer mesh, about 20-mesh for example, so as to retain the finer undigested feed and fiber particles. Very fine particles such as mineral matter and suspended solids (which comprise most of the valuable protein) pass through the second vibrating screen 14B.

The solid fraction from separator 14 is then fed to a sedond mixing tank 16, which may be essentially the same as tank 12, including an agitator 16A to mix the slurry to a uniform consistency and a trap 16B to collect rocks and other debris. A chain drag 17 may be used to deliver the solid fraction from separator 14 to tank 16 though any other suitable conveying or pumping means may be used.

The slurry from second tank 16 is coupled to a second liquid-solid separator 18 which may be the same as separator 14 including, for example, a coarse rotary screen 18A and a finer vibrating screen 18B for separating the liquid and solid fractions of the second slurry. Because the slurry in tank 16 is relatively thin (e.g., about 15 percent dry matter), the head in the tank will ordinarily be sufficient to allow gravity feed to separator 18 although an augur or similar device may be used as an auxiliary pumping means.

According to the preferred embodiment, the solid fraction from separator 18 is fed to a third mixing tank 20 which may be essentially the same as tanks 12 and 16 (although ordinarily a rock trap will not be required). The slurry from tank 20 is fed to a third liquid-solid separator 22 to separate the liquid and solid fractions of the third slurry. The separator 22 may include only a single vibrating screen 22B similar or identical to vibrating screens 14B and 18B.

The wet solids from the third separator 22 are then conveyed by a chain drag 23 or the like to a press 24 which compresses these wet solids to remove excess water. The solid matter remaining is composed principally of fiber and grain particles and is one of the two basic products recovered from the manure in accordance with the recycling process of the invention. It consists of about 45 percent dry matter and chemical analyses in feed trials with sheep and cattle have shown this product to be the equivalent of dried beet pulp or low-grade barley in feed value on a dry weight basis.

In accordance with a principal feature of the invention, the liquid fractions from the separators 18 and 22 and press 24 (which is also a separator) are recycled to the preceding slurry tanks 12, 16 and 20, respectively, to be mixed with the manure in those tanks. That is, liquid from separator 18 is returned to tank 12, liquid from separator 22 is returned to tank 16, and the liquid drawn off by press 24 is fed to tank 20. Suitable pumping means and valves (not shown) may be included in the various lines to control the liquid flows to the mixing tanks to maintain the respective slurries at their preferred consistencies. In the preferred embodiment, the only water introduced into the system (excluding the water contained in the raw manure) is wash water shown diagrammatically on line 26 which may be used to clean the fiber and grain matter on the vibrating screen 22B.

The use of a multi-stage slurrying and separating process provides more complete separation of fiber and grain material from the nutrients contained in the soluble matter of the manure and the fine particles which contain or constitute most of the recoverable protein. The solid fractions from the respective separators will have progressively higher concentrations of dry matter (i.e., grain and fiber) whereas the liquid fraction will become progressively clearer. As a result of the counter-current flow of the recycled liquid fractions as described, substantially less water is required for separation and the liquid fraction from separator 14 (i.e., the wash water from screen 14B) will contain an extremely high concentration (as high as 40 percent) of valuable proteineous particles held in a colloidal type suspension. Previously, economic recovery of these particles has proven difficult and substantial proteineous matter has been lost. However, in accordance with the invention, the concentration of these particles may be sufficiently great to allow separation by evaporation in a dryer 30 or similar device to which the liquid fraction from separator 14 is pumped or otherwise conveyed. Hence, the invention provides a liquid fraction having a higher concentration of proteineous material from which, consequently, removal of water is simpler. Moreover, because of this higher concentration, evaporation may be used to recover substantially all of such material and other solids.

The basic feed product recovered from press 24 may be further processed in several ways before being fed back to the animals in the feedlot. For example, the feed product from press 24 may be tumbled through an open flame to burn off the animal hair present in the product. After the hair has been burned off, the remaining product which is about 60 percent dry matter (because of partial dehydration) may be passed through an air separator, screen or other suitable device to separate the grain particles from the fiber particles. The grain particles constitute a high-energy feed and may be fed back directly to the animals in the feedlot. The fiber particles may be mixed with various feed supplements and then fed back to the animals.

Alternatively, after the hair has been removed, the product may be mixed with molasses or another carbohydrate such as sugar and then fermented to improve protein content, palatability, storability and shelf life in the feed bunks. Alternatively, the fermented product may be dehydrated, mixed with other feed ingredients and pelletized prior to being fed back to the animals.

The water content of raw manure will vary depending in part on clamatic conditions but depending to a great extent also on the nature of the feedlot. If the liquid content of the manure is excessive, it is possible that the liquid fraction from separator 14 will contain so much water that direct evaporation is not an efficient way to remove the proteineous matter. In such a case, the arrangement of FIG. 2 may be used to separate the protein particles from the liquid fraction from separator 14 although the process of FIG. 2 will not recover the solids in true solution.

In FIG. 2, the protein bearing liquid fraction from the vibrating screen 14B is fed to a small mixing tank 42 by any suitable conveying means. A flocculating agent is introduced into the small mixing tank 42 by a suitable dispensing device 44 which may be of a conventional type. The flocculating agent is a substance such as aluminum sulphate, ferric chloride or the like which can be fed in proper amounts to animals without danger. An agitator 45 is disposed within the small mixing tank 42 to thoroughly mix the flocculating agent with the manure slurry. The agitator 45 may be of a propeller-type agitator or other conventional agitator well-known to those skilled in the art. The proportion of flocculating agent required is typically between 0.5 and 2 percent by weight of the manure slurry depending on density. This flocculation process is important (where evaporation alone is not feasible) since studies have shown that protein is concentrated in microscopic entities in colloidal suspension. Therefore, they must be coagulated before they settle efficiently.

The manure slurry is conducted from the small mixing tank 42 to a large mixing tank 46 which is sufficiently large to allow the flocculating agent sufficient time to collect the suspended solids from the manure slurry so as to form flocs. A mixing device 48 is disposed within the tank 46 to slowly mix the manure slurry while the flocculating agent does its work. Mixing device 48 may be a paddle-wheel type device or other conventional mixing device such as, for example, the devices manufactured by the Link Belt Company of Chicago, Ill.

The flocculated manure slurry is conducted from the mixing tank 46 to a centrifuge 51 which separates the flocs from the water. The clarified water may then be conducted via line 53 back to the slurry tank 12 or recycled as the wash water on line 26.

The cake from centrifuge 51 constitutes the second basic product and may contain about 40 percent dry matter about 50 percent of which is protein. This protein-rich cake (and the solids from dryer 30) may be subjected to various additional processing steps prior to being fed back to the animals in the feedlot. For example, the product cake may be sterilized and preservatives added, mixed with other feeding ingredients, and then fed back to the animals as a liquid protein supplement. Alternatively, the protein can be dehydrated, mixed with other feed ingredients, pelletized and then fed back to the animals as dry feed. Another alternative is to mix the protein with molasses or other carbohydrates such as sugar and then ferment the mixture in a tank for about 2 days. This step can increase the protein content of the mix substantially and it then can be fed back to the animals in the feedlot. Still another alternative is to mix the centrifuge cake with about 1 percent sodium alginate or other gelling or adhesive compounds to make a gel which can be mixed with other feeds or fed directly to fish. Air can be mixed with the gel so the particles will float on a fish pond.

The invention thus provides an improved process for separating from manure nutrients in the form of fibers, grain and a high protein supplement. The proportions of these components change substantially according to what the cattle are fed but typical proportions of these feed components by dry weight for an intermediate roughage ration (after removal of debris) are as follows:

28% silage-type (fiber)
25% high-energy feed component (grain)
40% high protein component
7% mineral matter Moreover, in the case of manure from whole kernel corn-fed cattle up to about 35 percent by weight of the total recovered dry manure components comprises whole corn kernels which may be refed to the animals, thereby achieving considerable savings in feed costs. Further cost savings may be realized by the fact that the manure recycling process can eliminate the need for grinding or "flaking" the corn prior to feeding it to the animals. This would amount to a feed cost savings of up to 5 percent of the total cost of the feed.

In the preferred embodiment, a counter-current extraction process is used in which the liquid fraction of each stage is returned to the preceding slurry. Because of the nature of the manure, it is likely that the liquid and solid fractions of the respective slurries will not be in total equilibrium (i.e., the solids may not be physically distinct in the slurry and some soluble matter may remain undissolved). In such a case, it may be preferred to recycle internally a portion of the liquid fraction from the separators to the mixing tanks of the same stages (e.g., the liquid fraction from screen 18B to mixing tank 16) to increase residence time without requiring larger tanks. This may outweigh the disadvantage of increasing the solid concentration in the liquid fraction of each stage caused by such internal recycling.

A three step process as illustrated in FIG. 1 has been operated on an experimental basis but four and more stage systems may be operated in the future. To handle the manure from 20,000 head of cattle, the first tank may have a capacity of about 500 gallons and the others about half that. The output of such a plant would be about 100,000 pounds of dry matter per day.

As mentioned previously, the slurry in tank 12 may be 15 to 30 percent solid matter. The remaining slurries may be about 15 percent dry matter although substantial variation is possible. Using the counter-current process of the invention, the liquid fraction from vibrating screen 14B may contain about 40 percent solid material including fine particles in colloidal suspension whereas the liquid from screen 22B contains almost no solid matter.

Residence times in the tanks will depend on flow rates, tank size and the amount of internal recycling (if any). Without internal recycling, residence time in a 500 gallon tank would be about 20 minutes.

Chlorine kills bacteria and, therefore, tends to retard ensiling. Accordingly, if the fibers and grains from press 24 are to be fermented, the chlorine should be added to the liquid fraction from separator 14 instead of to the first slurry. This may not be a consideration if propionic acid (or similar acids normally produced by fermentation) are added directly to the fibers and grain from press 24.

If foaming of the slurries and/or liquid fractions presents problems, a suitable commercially available defoaming agent may be added as required.

Since hair contains protein but is not readily digestible, it may be desirable to recover the substantial amount of hair which is present in the manure for processing by known techniques. For this purpose, as an example, the mesh size of rotary screen 18A may be chosen so as to concentrate the hair at its output while still permitting most of the fibers and grain to pass through to screen 18B. The entire output of the screen 18A may then be hydrolized for use as a feed product or the hair may be further separated and hydrolized alone.

The dryer 30 may be of the rotary type used ordinarily for sludge drying as sold, for example, by Stearns-Rogers of Denver, Colo. The hot exhaust from the dryer may be fed back to the first slurry in the form of steam or otherwise.

Concrete floors for the feed pens are preferred to minimize the quantity of dirt and other debris in the manure. The manure should be scraped from the pens about every four days depending on weather to avoid excessive decomposition and/or putrefaction of valuable nutrients.

In general, the individual components of the system may be standard and in all cases commercially available equipment can be used. Obviously, numerous liquid/solid separating devices and techniques may be employed within the spirit of the invention. In place of the combination of a rotary screen and vibrating screen, a double deck vibrating screen with the coarse screen on top may be used. This may increase efficiency. A screw-type press may be an effective separator and centrifuges and settling tanks may also have utility. A chain drag may be used to assist in the removal of rocks and sand from the slurries. Press 24 may be a screw press although, in practice, excellent results have been obtained by pressing relatively small amounts of the solid fraction from screen 22B by a simple piston-type pressing arrangement. In this arrangement, a rotary table bearing a plurality of screened compartments receives batches of the solid fraction from the washing apparatus in successive compartments. As the table rotates, the piston is raised and lowered to successively press each small batch. The compressed contents of each compartment is removed when the compartment has rotated to a preselected discharge position.

An advantage of the invention lies in the substantial reduction in the amount of water required to separate the components of the manure. Where the raw manure contains excessive liquid it may not be necessary to add any water to the system and, in fact, it may be desirable to bleed off water. Since the water from the centrifuge 51 is highly clarified, and the amount of water to be disposed of is relatively low, disposal of this water in lagoons or on fields should create no serious environmental problems.

What is claimed is:

1. A process for recovering feed products from manure, comprising forming a first water-manure slurry, separating said first slurry into liquid and solid fractions, forming at least one additional water-manure slurry by mixing the solid fraction from the first slurry with water, separating liquid and solid fractions of said additional slurry, adding at least part of the separated liquid fraction of the additional slurry to the first slurry, and evaporating water in the liquid fraction of the first slurry to separate nutrients therefrom.

2. A process according to claim 1, wherein a plurality of additional successive water-manure slurries are formed and separated into liquid and solid fractions, with at least part of each liquid fraction being added to a solid fraction from a preceding separating step to form said successive slurries.

3. A process according to claim 2, wherein fresh water is added during the last separating step to wash the solid fraction produced by said last separating step.

4. A process according to claim 2, wherein the solid fraction from the last separating step is washed and pressed, and the liquid pressed therefrom is added to the last water-manure slurry.

5. A process according to claim 1, wherein the first slurry is heated to reduce its viscosity.

6. A process for deriving a high-protein feed supplement and a grain and fiber feed product from animal manure, comprising forming a first water-manure slurry, separating said first slurry into liquid and solid fractions, forming at least one additional water-manure slurry by mixing the solid fraction from the first slurry with water, separating liquid and solid fractions of said additional slurry, adding at least part of the separated liquid fraction of the additional slurry to the first slurry, the solid fraction separated from the last separating step comprising said grain and fiber feed product, and separating solid matter from the liquid in the liquid fraction of the first slurry, said solid matter comprising said high-protein feed supplement.

7. A process according to claim 1, wherein a floccing agent is added to said liquid fraction of said first slurry prior to separation of said solid material therefrom.

8. A process according to claim 1, wherein the solid fraction from the last separating step is pressed.

* * * * *